(12) United States Patent
Launders

(10) Patent No.: US 6,418,619 B1
(45) Date of Patent: Jul. 16, 2002

(54) METHOD OF MANUFACTURING AN ARTICLE BY SUPERPLASTIC FORMING AND DIFFUSION BONDING

(75) Inventor: Paul D Launders, Nottingham (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 09/678,370

(22) Filed: Oct. 2, 2000

(30) Foreign Application Priority Data

Oct. 14, 1999 (EP) .................................................. 9924219

(51) Int. Cl.[7] .................................................. B23P 15/00
(52) U.S. Cl. .................... 29/889.7; 29/889.1; 29/889.72
(58) Field of Search ............................ 29/889.7, 889.1, 29/889.72, 428; 228/118

(56) References Cited

U.S. PATENT DOCUMENTS

| 5,063,662 A | 11/1991 | Porter |
| 5,269,058 A | 12/1993 | Wiggs |
| 5,457,884 A | 10/1995 | Fowler |
| 5,581,882 A | 12/1996 | Fowler |

FOREIGN PATENT DOCUMENTS

EP 0 568 201 SP 7/1996
GB 2 269 555 A 2/1994

*Primary Examiner*—I Cuda Rosenbaum
(74) *Attorney, Agent, or Firm*—W. Warren Taltavull; Manelli Denison & Selter PLLC

(57) ABSTRACT

A method of manufacturing an article (10) from two metal workpieces (30,32), the first and second metal workpieces (30,32) define the outer profile of the article (10). The second workpiece (32) is thicker than the first workpiece (30). The first workpiece (30) has two flat surfaces (34,36) and the second workpiece has one flat surface (38) and one machined (42) surface (40). Stop of is applied to surface (34) to prevent diffusion bonding at preselected areas. The workpieces (30,32) are assembled into a stack (58) so that the flat surfaces (34,38) are in abutment. Heat and pressure are applied to diffusion bond the workpieces (30,32) together to form an integral structure (60). The integral structure (60) is placed in a die such that the first workpiece (30) faces a convex surface of the die. The integral structure (60) is heated to cause the integral structure (60) to be hot creep formed on the convex surface of the die. The integral structure (62) is hot formed in a superplastic forming die by heating and internally pressurising the integral structure (62) to cause a preselected area of the second workpiece to be hot formed to produce the article (10).

20 Claims, 3 Drawing Sheets

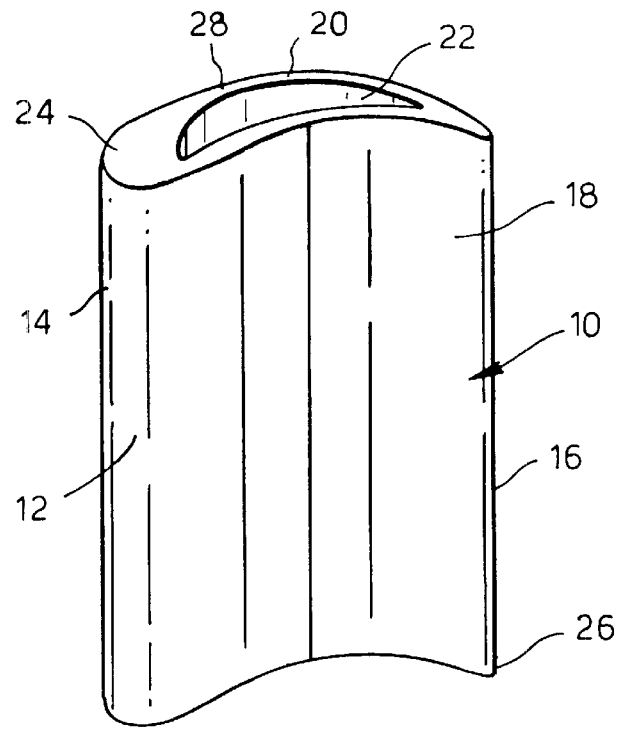
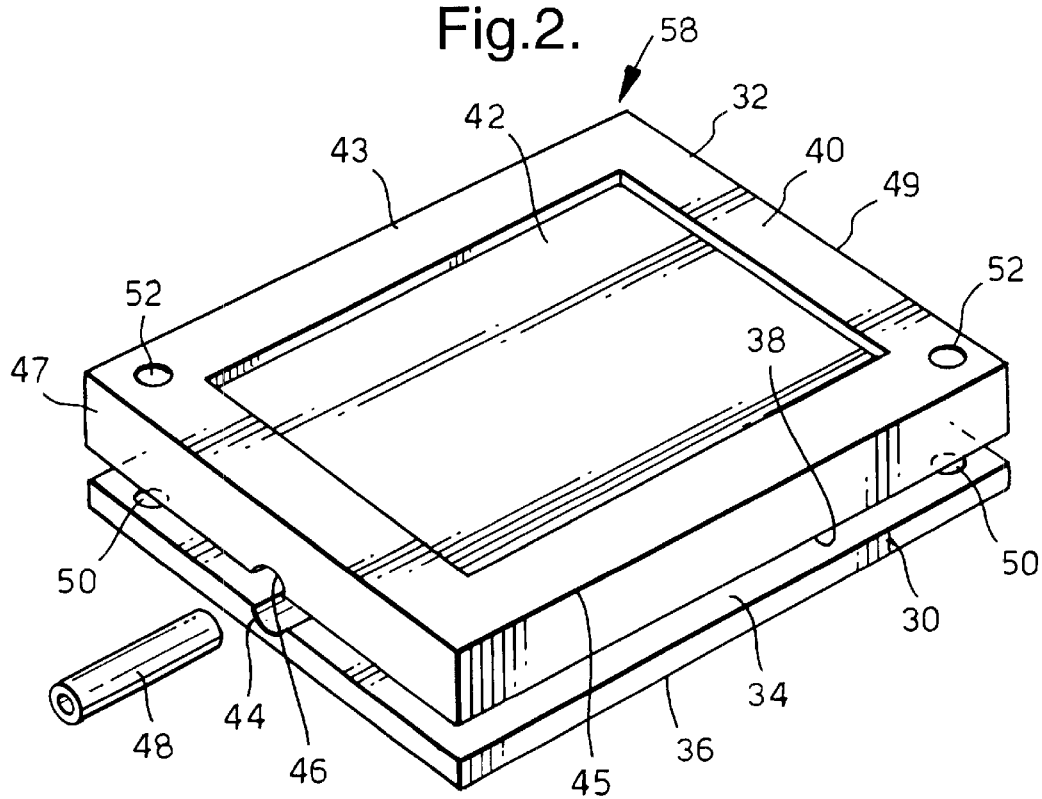

METHOD OF MANUFACTURING AN ARTICLE BY SUPERPLASTIC FORMING AND DIFFUSION BONDING

FIELD OF THE INVENTION

The present invention relates to a method of manufacturing an article by superplastic forming and diffusion bonding.

BACKGROUND OF THE INVENTION

It is known to manufacture hollow metallic articles by superplastic forming and diffusion bonding metal workpieces. These metal workpieces include elementary metal, metal alloys, intermetallic materials and metal matrix composites.

The superplastic forming and diffusion process may be used to produce contoured articles for example fan blades, or fan duct outlet guide vanes, for gas turbine engines by superplastically, or hot forming, an integral structure formed by the diffusion bonding process.

A procedure for manufacturing an article by superplastic forming and diffusion bonding is disclosed in our European patent EP0568201B. In EP0568201B the integral structure formed by the diffusion bonding process is twisted before the integral structure is superplastically formed. Additionally the integral structure is hot creep formed in the superplastic forming dies.

A procedure for manufacturing an article by superplastic forming and diffusion bonding is disclosed in our UK patent GB2269555B. In GB2269555B the surfaces of two of the metal workpieces are machined to produce a predetermined mass distribution in the metal workpieces. The opposite surfaces of the two metal workpieces are maintained flat and the flat surfaces are diffusion bonded together or are bonded to opposite surfaces of a third metal workpiece. The integral structure is hot creep formed in the superplastic forming dies.

However, there is a problem with this manufacturing process. The superplastic, or hot, forming of the integral structure, after diffusion bonding, in the dies results in creasing of the metal workpiece hot formed on the convex surface of the superplastic forming die. This is because the metal workpiece hot formed on the convex surface of the superplastic forming die is under compression. This results in non-conformance of the article with desired dimensions and may result in the scrapping of the article, and the resulting waist of material, time and money.

SUMMARY OF THE INVENTION

Accordingly the present invention seeks to provide a novel method of manufacturing an article by superplastic forming and diffusion bonding which overcomes the above mentioned problems.

Accordingly the present invention provides a method of manufacturing an article by superplastic forming and diffusion bonding at least two metal workpieces comprising the steps of:

(a) forming a first metal workpiece which has a flat surface, (b) forming a second metal workpiece which has a flat surface, the second metal workpieces being thicker than the first metal workpiece, the first and second metal workpieces defining the outer profile of the finished article, (c) machining the second metal workpiece on a surface opposite to the flat surface to give a predetermined mass distribution in the second metal workpiece, (d) applying a stop off material to prevent diffusion bonding to preselected areas of at least one of the flat surfaces of at least one of the at least two workpieces, (e) assembling the at least two metal workpieces into a stack relative to each other so that the flat surfaces are in mating abutment, (f) applying heat and pressure across the thickness of the at least two metal workpieces to diffusion bond the at least two metal workpieces together in areas other than the preselected areas to form an integral structure, (g) placing the integral structure in a hot creep forming die, the die having a convex surface, the integral structure being placed in the die such that the first metal workpiece faces the convex surface of the die, heating the integral structure while it is within the die to cause the integral structure to be hot creep formed on the convex surface of the die, (h) placing the integral structure in a superplastic forming dies heating the integral structure and internally pressurising the integral structure while it is within the die to cause the preselected area of at least the second metal workpiece to be hot formed to produce a hollow article of predetermined shape.

After twisting the integral structure and before superplastic forming the integral structure, the contoured integral structure may be internally pressurised to break the adhesive bond between the stop off material and the at least one workpiece in the preselected area.

Preferably after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

Preferably after diffusion bonding the stack of workpieces and before superplastically forming the integral structure, the integral structure is internally pressurised to break the adhesive bond between the stop off material and the at least one workpiece in the preselected area.

Preferably after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

Preferably after the metal workpieces are arranged in a stack and before the metal workpieces are diffusion bonded together to form an integral structure, the edges of the metal workpieces are sealed.

Preferably the edges of the metal workpieces are welded together.

Preferably where the metal workpieces are made of a titanium alloy, the metal workpieces are heated to a temperature equal to, or greater than, 850° C. and the pressure applied is equal to, or greater than, $20 \times 10^5$ $Nm^{-2}$ to diffusion bond the workpieces together to form an integral structure.

Preferably the metal workpieces are heated to a temperature between 900° C. and 950° C. and the pressure applied is between $20 \times 10^5$ $Nm^{-2}$ and $30 \times 10^5$ $Nm^{-2}$.

Preferably the integral structure is heated to a temperature equal to, or greater than, 850° C. to superplastically form the integral structure.

Preferably the integral structure is heated to a temperature between 900° and 950° C.

Preferably the integral structure is hot creep formed at a temperature equal to, or greater than, 740° C.

Preferably step (c) comprises milling, electrochemical machining chemical machining, or electrodischarge machining.

BRIEF DESCRIPTION OF THE DRAWINGS

The present invention will be more fully described by way of example with reference to the accompanying drawings in which:

FIG. 1 shows an article manufactured by superplastic forming and diffusion bonding according to the present invention.

FIG. 2 illustrates an exploded view of a stack of two metal workpieces which are superplastically formed and diffusion bonded to form an article according to the present invention.

DETAILED DESCRIPTION OF THE INVENTION

Figure 3:
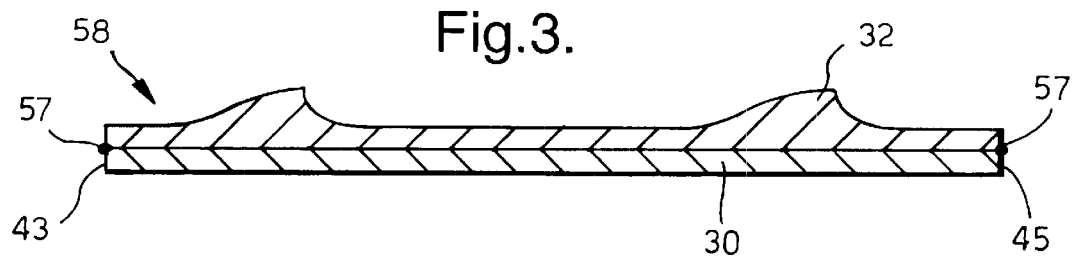
FIG. 3 is cross-section through the stack of metal workpieces shown in FIG. 2 before the diffusion bonding step of the invention has been performed.

A turbofan gas turbine engine fan outlet guide vane 10, shown in FIG. 1, comprises an aerofoil shaped body 12 which has a leading edge 14, a trailing edge 16, a concave surface 18, a convex surface 20, a root 26 and a tip 28. The fan outlet guide vane 10 is hollow and comprises a space 22 within the aerofoil shaped body 12. The majority of the mass of material 24 defining the leading edge 14 of the aerofoil shaped body 12 is disposed towards the convex surface 20 of the aerofoil shaped body 12.

In FIGS. 2 and 3, two sheets of titanium alloy 30 and 32 are assembled into a stack 58. The sheet 30 has flat surfaces 34 and 36 and the sheet has a single flat surface 38. The flat surfaces 34 and 38 of the sheets 30 and 32 respectively are arranged to abut each other. It is to be noted that the second sheet 32 is thicker than the first sheet 30. The thickness of the first sheet 30 is selected to be substantially the same as the thickness required for the concave wall in the finished fan outlet guide vane 10.

Prior to assembling the sheets 30 and 32 into the stack 58, the second sheet 32 is machined in a region 42 centrally of the surface 40 of the second sheet 32. The central machined region 42 is contoured to produce a variation in the mass distribution of the fan outlet guide vane 10 from leading edge 14 to trailing edge 16 and from root 26 to tip 28 by varying the depth of machining, i.e. varying the thickness of the second sheet 32, across the central machined region 42 in the direction between the edges 43 and 45 and in the direction between the ends 47 and 49 of the second sheet 32. The maximum depth of machining of the central machined region 42 is such as to leave a thickness substantially the same as the thickness required for the convex wall in the finished fan outlet guide vane 10.

The machining of the central machined region 42 of the second sheet 32 is by milling, electrochemical machining, chemical machining, electrodischarge machining or any other suitable machining process.

The abutting surfaces 34 and 38 of the sheets 30 and 32 are then prepared for diffusion bonding by chemical cleaning. One of the abutting surfaces 34 and 38, in this example abutting surface 34, has had a stop off material applied. The stop off material may comprise powdered yttria in a binder and solvent e.g. the stop off known as "Stopyt 62A" which is sold by an American company named GTE Service Corporation of 100 Endecott Street, Danvers, Mass. 10923, USA.

The stop off material is applied in desired patterns, by the known silk screen printing process. The desired patterns of stop off material prevent diffusion bonding between preselected areas of the sheets 30 and 32. In this example the stop off is applied substantially over the whole of the surface 34 except for regions adjacent the edges 43 and 45 and ends 47 and 49 sufficient to provide a satisfactory diffusion bond.

The sheet 30 has a pair of dowel holes 50, which are axially aligned with corresponding, dowel holes 52 in sheet 32 to ensure the correct positional relationship between the two sheets 30 and 32. The sheets 30 and 32 are maintained in this positional relationship by a pair of dowels (not shown) which are inserted into the axially aligned dowel holes 50 and 52.

The sheets 30 and 32 of the stack 58 are placed together to trap an end of a pipe 48. In this example a groove 44 is machined on surface 34 of the first sheet 30 and a groove 46 is machined on surface 38 of the second sheet 32. The pipe 48 is positioned to project from between the two sheets 30 and 32. One end of the pipe 48 interconnects with the pattern of stop off material between the sheets 30 and 32. On completion of the assembly in the manner described it is welded about its periphery so as to weld 59 the edges and ends of sheets 30 and 32 together. The pipe 48 is also welded around its periphery to the sheets 30 and 32. A sealed assembly 59 is formed except for the inlet provided by the pipe 48, as shown in FIG. 3.

It is of course possible to provide a groove on just one of the abutting surfaces 34 and 38 of the sheets 30 and 32 respectively.

The pipe 48 is then connected to a vacuum pump which is used to evacuate the interior of the sealed assembly 59 and then inert gas, for example argon, is supplied to the interior of the sealed assembly 59. This evacuating and supplying inert gas to the interior of the sealed assembly 59 may be repeated several times in order to ensure that most, or substantially all, traces of oxygen are removed from the interior of the sealed assembly 59. The particular number of times that the interior of the sealed assembly 59 is evacuated and purged with inert gas depends upon the size of the workpieces and upon the required integrity of the finished component or article. The smaller the traces of oxygen remaining, the greater the quality of the subsequent diffusion bond. The inert gas is supplied to pressurise the interior of the sealed assembly 59 to atmospheric pressure.

The sealed assembly 59 is evacuated and is placed in an oven. The sealed assembly 59 is then heated to a temperature between 250° C. and 350° C. to evaporate the binder from the stop off material. During the baking out of the binder, the sealed assembly 59 is continuously evacuated to remove the binder from between the sheets 30 and 32. After the binder has been removed, which is determined either by monitoring the binder levels in the gas extracted from the sealed assembly 59 or by maintaining the sealed assembly 59 at the temperature between 250° C. and 350° C. for a predetermined time, the sealed assembly 59 is removed from the oven and is allowed to cool to ambient temperature whilst being continuously evacuated. The binder is baked out of the sealed assembly 59 at a suitably low temperature to reduce, or prevent, oxidation of the exterior surface of the sealed assembly 59.

The pipe 48 is then sealed so that there is a vacuum in the sealed assembly 59. The sealed assembly 59 is then transferred carefully to an autoclave. The temperature in the autoclave is increased such that the sealed assembly 59 is heated to a temperature greater than 850° C. and the argon pressure in the autoclave is raised to greater than 20 atmospheres, 294 pounds per square inch ($20.26 \times 10^5$ $Nm^{-2}$) and held at that temperature and pressure for a predetermined time. Preferably the sealed assembly 59 is heated to a temperature between 900° C. and 950° C. and the pressure is between 294 pounds per square inch ($20.26 \times 10^5$ $Nm^{-2}$) and 441 pounds per square inch ($30.39 \times 10^5$ $Nm^{-2}$). For example if the sealed assembly 59 is heated to a temperature of 925° C. and the pressure is raised to 300 pounds per square inch the temperature and pressure are held constant for about two hours. The pressure is then reduced to ambient, diffusion bonding having been achieved and the sealed assembly 59, which is then an integral structure 60, is removed from the autoclave. The diffusion bonding has occurred at regions 54 indicated by dashed lines and diffusion bonding has been prevented at regions 56.

Figure 4:
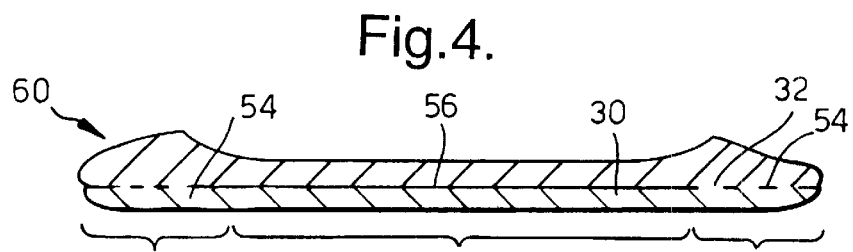
FIG. 4 is a cross-section through the integral structure after the diffusion bonding step has been performed.

The leading edge 14 and trailing edge 16 of the fan outlet guide vane 10 are machined, by any suitable process, approximately to shape after diffusion bonding as shown in FIG. 4.

The pipe 48 is removed from the integral structure 60 and a second pipe is fitted to the integral structure 60.

Figure 5:
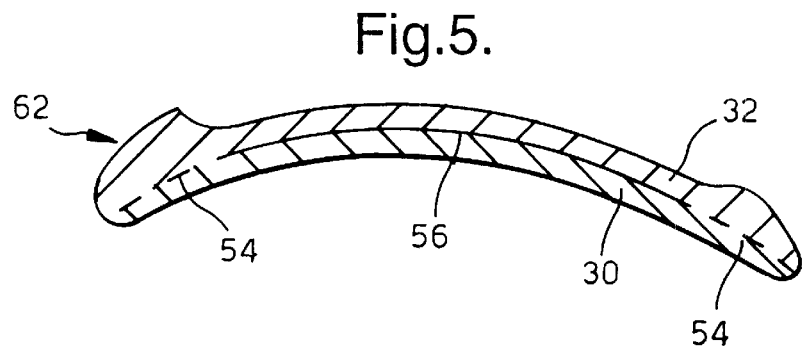
FIG. 5 is a cross-section through the integral structure after the hot creep forming step has been performed.
Figure 9:
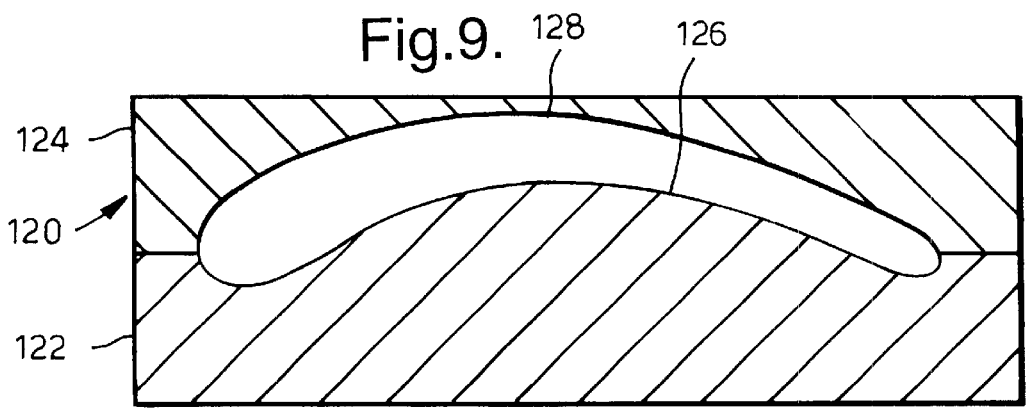
FIG. 9 is a cross-section through a die for the hot creep forming step.

The integral structure 60 is then placed in a hot creep forming die 120, as shown in FIG. 9, which comprises a concave surface 128 and a convex surface 126. The integral structure 60 is placed in the die such that the first sheet 30 faces the convex surface 126 of the die 120 and the second sheet 32 faces the concave surface 128 of the die 120. The integral structure 60 is heated while it is within the die 120 to cause the integral structure 60 to be hot creep formed on the convex surface 126 of the die 120 to produce an aerofoil shape as shown in FIG. 5. The first sheet 30 takes the shape of the convex surface 126 of the die 120. During the hot creep forming process the integral structure is heated to a temperature of 740° C.

The hot creep formed integral structure 62 is then placed in a superplastic forming die, which comprises a concave surface and a convex surface. The hot creep formed integral structure 62 is placed in the die such that the first sheet 30 abuts the convex surface of the die and the second sheet 32 faces and is spaced from the concave surface of the die. The convex surface of the die is substantially the same shape as the convex surface 126 of the hot creep forming die 120 and the first sheet 30. Inert gas, for example argon, is introduced into the areas, within the hot creep formed integral structure 62, containing the stop off in order to break the adhesive grip, which the diffusion bonding pressure has brought about. The argon is carefully introduced to those areas which contain the stop off, and the argon seeps through the stop off and eventually reaches the opposing end of the hot creep formed integral structure 62. The argon must travel the whole length of the interior of the hot creep formed integral structure 62 such as to break the adhesive grip between the stop off and the workpieces brought about during the diffusion bonding step.

This step may be carried out at room temperature because the metal is elastic at room temperature and the minimal extension, which occurs, does not go beyond the elastic limit. Consequently the hot creep formed integral structure 62 regains its shape when pressure is removed at the end of the step. Alternatively the step may be carried out at the superplastic forming temperature, however there is a serious risk of progressive plastic deformation lengthwise of the hot creep formed integral structure 62, rather than simultaneous deformation over the whole of the hot creep formed integral structure 62. Nevertheless the skilled artisan will be able to control the breaking of the adhesive grip by suitable control of the pressure of the argon.

The second pipe 48 is then connected to a vacuum pump which is used to evacuate the interior of the hot creep formed integral structure 62 and then inert gas, for example argon, is supplied to the interior of the hot creep formed integral structure 62. This process of evacuating and supplying inert gas to the interior of the hot creep formed integral structure 62 may be repeated several times in order to ensure that most, or substantially all, traces of oxygen are removed from the interior of the hot creep formed integral structure 62. The particular number of times that the interior of the hot creep formed integral structure 62 is evacuated and purged with inert gas depends upon the size of the workpieces and upon the required integrity of the finished component. The inert gas is supplied to pressurise the interior of the hot creep formed integral structure 62 to atmospheric pressure.

Figure 6:
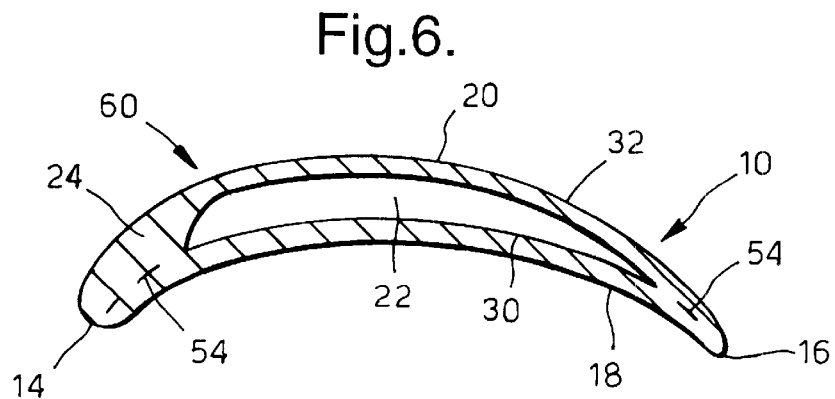
FIG. 6 is a cross-section through the integral structure after the superplastic forming step has been performed.

The hot creep formed integral structure 62 and superplastic forming die is placed in an autoclave. The hot creep formed integral structure 62 is again heated to a temperature greater than 850° C., preferably between 900° C. and 950° C. In this example, the dies and hot creep formed integral structure 62 are heated to 925° C. Inert gas, for example argon, is introduced into the interior of the hot creep formed integral structure 62 between the sheets 30 and 32, so as to hot form the sheet 32 onto the concave surface of the die which generates a hollow internal structure depending on the pattern of the applied stop off, as shown in FIG. 6.

On completion of hot forming, the inert argon atmosphere within the integral structure is maintained whilst the structure is cooled. The integral structure is then machined and/or ground to remove excess metal and to produce the required leading edge and trailing edge shapes of the finished fan outlet guide vane 10.

Alternatively the integral structure 60 is placed in the superplastic forming die. The first sheet 30 is hot creep formed into the shape of the convex surface of the die and then the second sheet 32 is hot formed into the shape of the concave surface of the die.

The advantage of this process is that the superplastic, or hot, forming of the integral structure, after diffusion bonding, in the dies does not result in creasing of the metal workpiece on the convex surface of the superplastic forming die. This is because the metal workpiece is hot creep formed on the convex surface of a die under much less compression before the superplastic, or hot, forming of the second workpiece into the concave surface of the die. This results in an article with desired dimensions. Additionally only the second workpiece is machined this reduces waist of material, time and money. The first workpiece is selected to have a thickness of standard sheet metal to reduce cost and only the second sheet does not have a thickness of standard sheet metal.

Figure 7:
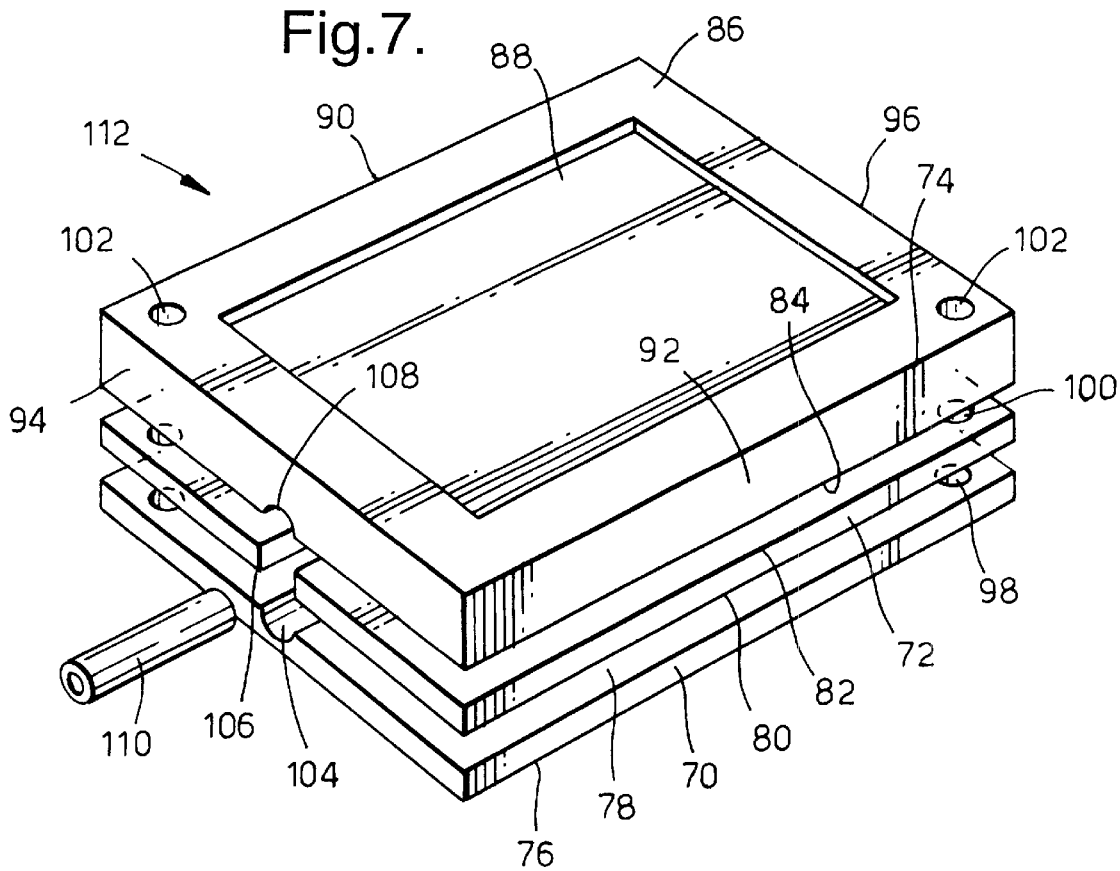
FIG. 7 illustrates an exploded view of a stack of three metal workpieces which are superplastically formed and diffusion bonded to form an article according to the present invention.
Figure 8:
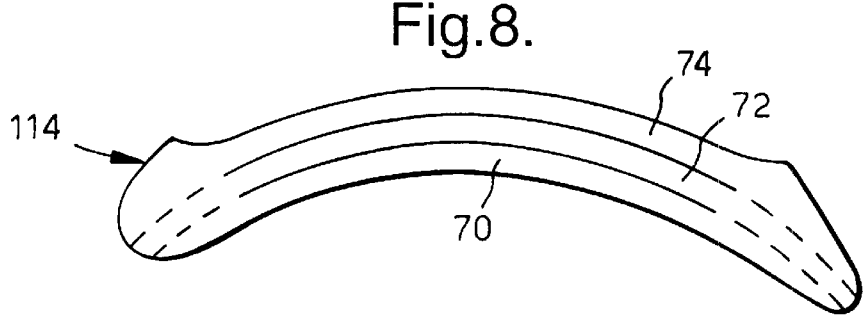
FIG. 8 is a cross-section through the integral structure after the hot creep forming step has been performed.

Another embodiment of the invention is shown in FIGS. 7 and 8. In this embodiment three sheets of titanium alloy 70, 72 and 74 are assembled into a stack 112 as shown in FIG. 7. The sheet 70 has flat surfaces 76 and 78, the sheet 72 has flat surfaces 80 and 82 and sheet 74 has a single flat surface 84. The flat surfaces 78 and 80 of the sheets 70 and 72 respectively are arranged to abut each other. The flat surfaces 82 and 84 of the sheets 72 and 74 respectively are arranged to abut each other. It is to be noted that the second sheet 74 is thicker than the first sheet 70. The thickness of the first sheet 70 is selected to be substantially the same as the thickness required for the concave wall in a finished fan blade.

Prior to assembling the sheets 70, 72 and 74 into the stack 112, the second sheet 74 is machined in a region 88 centrally of the surface 86 of the second sheet 74. The central machined region 88 is contoured to produce a variation in the mass distribution of the fan blade from leading edge to trailing edge and from root to tip by varying the depth of machining, i.e. varying the thickness of the second sheet 74, across the central machined region 88 in the direction between the edges 90 and 92 and in the direction between the ends 94 and 96 of the second sheet 74. The maximum depth of machining of the central machined region 88 is such as to leave a thickness substantially the same as the thickness required for the convex wall in the finished fan blade.

The machining of the central machined region 88 of the second sheet 74 is by milling, electrochemical machining, chemical machining, electrodischarge machining or any other suitable machining process.

The abutting surfaces 78, 80, 82 and 84 of the sheets 70, 72 and 74 are then prepared for diffusion bonding by chemical cleaning. One of the abutting surfaces 78 and 80, in this example abutting surface 78, has had a stop off material applied and one of the abutting surfaces 82 and 84, in this example abutting surface 82, has had a stop off material applied. The stop off material may comprise powdered yttria in a binder and solvent e.g. the stop off known as "Stopyt 62A" which is sold by an American company named GTE Service Corporation of 100 Endecott Street, Danvers, Mass. 10923, USA.

The stop off material is applied in desired patterns, by the known silk screen printing process. The desired patterns of stop off material prevent diffusion bonding between preselected areas of the sheets 70, 72 and 74. In this example the stop off is applied in straight lines, but it may be applied as dots or other suitable patterns on the surfaces 78 and 82 except for regions adjacent the edges 90 and 92 and ends 94 and 96 sufficient to provide a satisfactory diffusion bond.

The sheet 70 has a pair of dowel holes 98 which are axially aligned with corresponding dowel holes 100 in sheet 72 and dowel holes 102 in sheet 74 to ensure the correct positional relationship between the three sheets 70, 72 and 74. The sheets 70, 72 and 74 are maintained in this positional relationship by a pair of dowels (not shown) which are inserted into the axially aligned dowel holes 98, 100 and 102.

The sheets 70, 72 and 74 of the stack are placed together to trap an end of a pipe 110. In this example a groove 104 is machined on surface 78 of the first sheet 70, a groove 108 is machined on surface 84 of the second sheet 74 and a slot 106 is machined in the end 94 of the third sheet 72. The pipe 110 is positioned to project from between the three sheets 70, 72 and 74. One end of the pipe 110 interconnects with the pattern of stop off material between the sheets 70, 72 and 74. On completion of the assembly in the manner described it is welded about its periphery so as to weld the edges and ends of sheets 70, 72 and 74 together. The pipe 110 is also welded around its periphery to the sheets 70, 72 and 74. A sealed assembly is formed except for the inlet provided by the pipe 110.

Thereafter the sealed assembly is heated whilst being evacuated to remove the solvent from the stop off substantially as disclosed previously. The pipe 110 is sealed and the sealed assembly is placed in an autoclave and heat and pressure are applied to the sealed assembly to diffusion bond the three sheets 70, 72 and 74 together in the preselected areas to form an integral structure substantially as described previously.

The integral structure is hot creep formed in a die 120 to produce a hot creep formed integral structure 114 as shown in FIG. 8 substantially as described previously.

The hot creep formed integral structure 114 superplastic forming die is placed in an autoclave. The hot creep formed integral structure 114 is again heated to a temperature greater than 850° C., preferably between 900° C. and 950° C. In this example, the dies and hot creep formed integral structure 114 are heated to 925° C. Inert gas, for example argon, is introduced into the interior of the hot creep formed integral structure 114 between the sheets 70 and 72 and between the sheets 72 and 74, so as to hot form the sheet 74 onto the concave surface of the die and to superplastically form the sheet 72 which generates a hollow internal structure depending on the pattern of the applied stop off.

The magnitude of the movement of at least one of the sheets during deformation is such as to require superplastic extension to occur. The term "superplastic" is a standard term in the metal forming art and will not be described herein.

In order to achieve superplastic forming without rupturing the thinning metal the argon is introduced in a series of pulses, at a pre-calculated rate which will achieve a desired strain rate, as is taught at pp 615–623 in the book "The Science, Technology and Application of Titanium" edited by R. I. Jaffe and N. E. Promisel, published by Pergamon Press in 1970, which is hereby incorporated by reference. The method ensures that the metal is subjected to that strain rate which will achieve the maximum permissible speed of extension at any given point in the procedure. The rate of application, and/or volume of the pulses of the gas pulses may thus vary during the expansion of the sheets 72 and 74.

On completion of superplastic forming, the inert argon atmosphere within the integral structure is maintained whilst the structure is cooled. The integral structure is then machined and/or ground to remove excess metal and to produce the required leading edge and trailing edge shapes of the finished fan blade.

Although the description has referred to fan outlet guide vanes and fan blades the invention is equally applicable to other article or components which have contoured surfaces.

Although the description has referred to titanium sheets, or workpieces, the invention is equally applicable to other metal sheets, or workpieces, which may be hot formed or superplastically formed.

I claim:

1. A method of manufacturing an article having an outer profile by superplastic forming and diffusion bonding at least two metal workpieces comprising the steps of:
   (a) forming a first metal workpiece which has a first flat surface and a second flat surface,
   (b) forming a second metal workpiece which has a first flat surface, the second metal workpiece being thicker than the first metal workpiece, the first and second metal workpieces defining the outer profile of the article, (c) machining the second metal workpiece on a second surface opposite to the first flat surface to give a predetermined mass distribution in the second metal workpiece, (d) applying a stop off material to prevent diffusion bonding to preselected areas of at least one of the flat surfaces of at least one of the at least two workpieces, (e) assembling the at least two metal workpieces into a stack relative to each other so that the first flat surfaces of the first and second metal workpieces are in mating abutment, (f) applying heat and pressure across the thickness of the at least two metal workpieces to diffusion bond the at least two metal workpieces together in areas other than the preselected areas to form an integral structure, (g) placing the integral structure in a hot creep forming die, the die having a convex surface, the integral structure being placed in the die such that the second flat surface of the first metal workpiece faces the convex surface of the die, heating the integral structure while it is within the die to cause the integral structure to be hot creep formed on the convex surface of the die, (h) placing the integral structure in a superplastic forming dies heating the integral structure and internally pressurising the integral structure while it is within the die to cause the preselected area of at least the second metal workpiece to be hot formed to produce a hollow article of predetermined shape.

2. A method as claimed in claim 1 wherein step (c) comprises machining the second metal workpiece to varying depths up to a maximum depth, the maximum depth of machining is such that the remaining thickness of the second metal workpiece is equal to the thickness of the first metal workpiece.

3. A method a claimed in claim 1 wherein the hollow article is a fan outlet guide vane.

4. A method as claimed in claim 1 comprising a superplastically forming and diffusion bonding three metal workpieces, the third metal workpiece having flat surfaces, wherein in step (e) the three metal workpieces are assembled into the stack relative to each other so that the third metal workpiece is between the first and second metal workpieces and the flat surfaces are in mating abutment, said stack having opposite ends.

5. A method as claimed in claim 4 wherein the hollow article is a fan blade.

6. A method as claimed in claim 1 wherein the hot creep forming die used in step (g) is the superplastic forming die used in step (h).

7. A method as claimed in claim 4 wherein after diffusion bonding the stack of workpieces and before superplastically forming the integral structure, the integral structure is heated and loads are applied to opposite ends of the integral structure to twist one end relative to the other end to contour the integral structure to a predetermined shape.

8. A method as claimed in claim 7 wherein after twisting the integral structure and before superplastic forming the integral structure, the contoured integral structure is internally pressurised to break the adhesive bond between the stop off material and the at least one workpiece in the preselected area.

9. A method as claimed in claim 8 wherein after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

10. A method as claimed in claim 1 wherein after diffusion bonding the stack of workpieces and before superplastically forming the integral structure, the integral structure is internally pressurised to break the adhesive bond between the stop off material and the at least one workpiece in the preselected area.

11. A method as claimed in claim 10 wherein after internally pressurising the integral structure to break the adhesive bond and before internally pressurising the integral structure to superplastically form at least one metal workpiece, the interior of the integral structure is sequentially evacuated and supplied with inert gas to remove oxygen from the interior of the integral structure.

12. A method as claimed in claim 1 wherein the metal workpieces have edges and after the metal workpieces are arranged in a stack and before the metal workpieces are diffusion bonded together to form an integral structure, the edges of the metal workpieces are sealed.

13. A method as claimed in claim 12 wherein the edges of the metal workpieces are welded together.

14. A method as claimed in claim 1 wherein where the metal workpieces are made of a titanium alloy, the metal workpieces are heated to a temperature equal to, or greater than, 850° C. and the pressure applied is equal to, or greater than, $20\times10^5$ $Nm^{-2}$ to diffusion bond the workpieces together to form an integral structure.

15. A method as claimed in claim 14 wherein the metal workpieces are heated to a temperature between 900° C. 950° C. and the pressure applied is between $20\times10^5$ $Nm^{-2}$ and $30\times10^5$ $Nm^{-2}$.

16. A method as claimed in claim 1 wherein the integral structure is heated to a temperature equal to, or greater than, 850° C. to superplastically form the integral structure.

17. A method as claimed in claim 16 wherein integral structure is heated to a temperature between 900° and 950° C.

18. A method as claimed in claim 1 wherein the integral structure is hot creep formed at a temperature equal to, or greater than, 740° C.

19. A method as claimed in claim 1 wherein in step (c), the machining comprises one of milling, electrochemical machining, chemical machining, or the electrodischarge machining.

20. A method as claimed in claim 1 wherein the thickness of the first metal workpiece is substantially the same as the thickness required for the finished hollow article.

* * * * *